United States Patent [19]

Smith

[11] Patent Number: 4,506,432
[45] Date of Patent: Mar. 26, 1985

[54] METHOD OF CONNECTING JOINTS OF DRILL PIPE

[75] Inventor: Jackie E. Smith, Houston, Tex.

[73] Assignee: Hughes Tool Company, Houston, Tex.

[21] Appl. No.: 538,648

[22] Filed: Oct. 3, 1983

[51] Int. Cl.³ .............................................. B23P 25/00
[52] U.S. Cl. ................................... 29/458; 29/526 R; 10/1 R; 285/329; 285/334
[58] Field of Search .................. 29/458, 526 R; 10/1; 285/94, 333, 390, 329, 334; 403/303

[56] References Cited

U.S. PATENT DOCUMENTS

| | | | |
|---|---|---|---|
| 1,141,151 | 6/1915 | Speller | 285/333 X |
| 2,058,841 | 10/1936 | Thomson | 10/1 R |
| 2,084,209 | 6/1937 | McDlroy | 29/458 X |
| 2,173,003 | 9/1939 | Place | 285/390 X |
| 2,308,066 | 1/1943 | Evans | 285/333 |
| 2,681,815 | 6/1954 | McCarn | 285/390 X |
| 3,294,682 | 12/1966 | MacKinnon | 285/94 X |
| 3,468,563 | 9/1969 | Duret | 285/94 X |
| 3,659,882 | 5/1972 | Souresny | 285/333 |

FOREIGN PATENT DOCUMENTS 658029 10/1951 United Kingdom ............... 285/334

*Primary Examiner*—Charlie T. Moon
*Attorney, Agent, or Firm*—Robert A. Felsman; Charles D. Gunter, Jr.

[57] ABSTRACT

A method of connecting a joint of drill pipe for rotary earth drilling having tool joint members on each end with threaded connections for connecting the joint with other joints of drill pipe is shown. Nickel plating is applied to a portion of the threaded connection of at least one of the tool joint members. The threaded connection is then doped with a zinc base thread compound and the joint of drill pipe is made up by threadedly connecting the nickel plated threaded connection of one tool joint member with the threaded connection of a mating tool joint member. The nickel plated tool joint member when used with zinc base thread compound provides a connection with desirable frictional properties at elevated temperatures such as are encountered in geothermal wells.

3 Claims, 1 Drawing Figure

METHOD OF CONNECTING JOINTS OF DRILL PIPE

BACKGROUND OF THE INVENTION

The present invention relates generally to joints of drill pipe for rotary earth drilling having tool joint members on each end with threaded connections for connecting the joints with other joints of drill pipe and, specifically, to such tool joint members having improved frictional properties at elevated temperatures, and a method of connecting the same.

A drill pipe string of the type used in rotary earth drilling is comprised of joints of drill pipe which have box and pin members secured to the opposite ends thereof by suitable means, such as welding. The "box" tool joint member is internally threaded and adapted to receive a mating externally threaded "pin" tool joint member. Mating joints of drill pipe are interconnected to form the pipe string used in the rotary earth drilling process to suspend, support and rotate a drill bit and produce a borehole. It is necessary that the joints of drill pipe be made up tightly enough to prevent leakage, wobble, and unscrewing. Power tongs and power driven cable winches are often used to provide the torque to make up the tool joint connections. The frictional properties of the threaded connections of the tool joint members are important since these frictional properties dictate the amount of torque that can be transmitted by the tool joint. The higher the friction coefficient, the greater the torque transmitting capability and the less the chance of additional makeup occuring down the hole. Insufficient frictional engagement can allow excessive makeup which can burst the box or stretch, crack or completely break the pin.

In order to maintain a high coefficient of friction between the threaded connections of the box and pin tool joint members, zinc base thread compounds are widely used. The zinc base thread compound or "dope" allows the tool joints to be broken out easily and also minimizes excessive make up during drilling. A problem exists, however, with the use of zinc base thread compounds in high temperature drilling environments such as in geothermal wells. The zinc base thread compound tends to lose its lubrication properties at higher temperatures and it is then difficult to break the tool joint connection when tripping pipe out of the well bore. Because of this problem, copper base thread compounds are traditionally used in geothermal wells and other high temperature drilling environments. The copper base thread compound maintains its lubrication properties at higher temperatures allowing the tool joints to be broken out more easily. However, because the coefficient of friction of the copper base thread compound is lower, torsional failures are more likely since additional makeup occurs between the pin and box resulting in stretched pins and other problems.

It has now been discovered that by nickel plating the tool joint threaded connections, zinc base thread compounds can be utilized without producing the undesirable effects generally associated with zinc base compounds at higher temperatures.

SUMMARY OF THE INVENTION

The present invention concerns a method of connecting a joint of drill pipe for rotary earth drilling having tool joint members on each end with threaded connections for connecting the joints with other joints of drill pipe. Nickel plating is applied to a portion of the threaded connection of at least one of the tool joint members. The threaded connection is then doped with a zinc base thread compound and the joint of drill pipe is made up by threadedly connecting the nickel plated threaded connection of one tool joint member with the threaded connection of a mating tool joint member. Preferably, both the pin and box tool joint members are nickel plated. At least one of the pin and box tool joint members is heat treated to produce a different hardness in the nickel plating of the member so treated to lessen the possibility of galling the threads.

Additional objects, features and advantages will be apparent in the written description which follows.

DETAILED DESCRIPTION OF THE INVENTION

Figure 1:
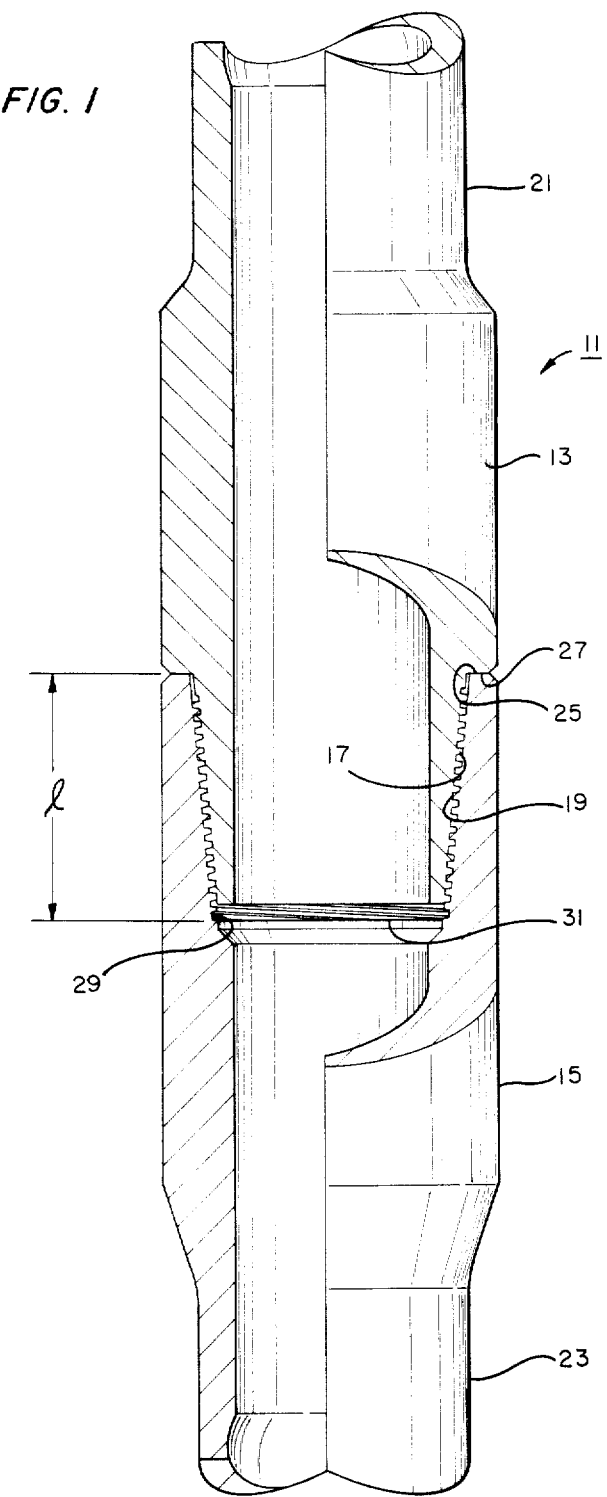
FIG. 1 is a side partial cross-sectional view of a tool joint of the invention with portions of the tool joint being shown broken away.

FIG. 1 shows a joint of drill pipe of the invention designated generally as 11. The joint 11 has tool joint members 13, 15 on each end with threaded connections 17, 19 for connecting the joints with other joints of drill pipe. The externally threaded connection 17 is referred to as a "pin" and is adapted to matingly engage the internally threaded connection 19 referred to as a "box". The tool joint members 13, 15 are each secured to a length of drill pipe 21, 23, as by welding. During make up of the tool joint, the box end face 25 engages the pin shoulder 27, as shown in FIG. 1.

In the practice of the present invention, nickel plating is applied to a portion of the threaded connection 17, 19 of at least one of the tool joint members 13, 15. The nickel plating can be accomplished by any of the known techniques such as electroless nickel plating or electro-nickel plating. The nickel plating is preferably applied to the threaded connection of both the pin and box 17, 19 tool joint members of the joint of drill pipe and is preferably applied over the entire threaded connection to at least the last full thread of the respective tool joint member and the box end face 25 and the pin shoulder 27. As shown in FIG. 1, the length "l" indicates that portion of the internally threaded box connection 19 from and including the box end face 25 to the last full thread 29 which is preferably nickel plated. The pin threaded connection 17 of the tool joint member 13 is also preferably plated from the pin end 31 to and including the pin shoulder 27 which contacts the box end face 25 during make up. The nickel plating is preferably applied to a thickness in the range from about 0.0002 to 0.0004 inches. The nickel plating preferably has about 90% to 92% nickel and 8% to 10% phosphorus.

When both the pin and box threaded connections 17, 19 are nickel plated, preferably at least one of the pin and box tool joint members nickel plated portions is heat treated to produce a different hardness in the nickel plating of the member so treated to thereby avoid galling in making up the threaded connection. Where the pin and box threaded connections 17, 19 are both nickel plated, the box nickel plating is preferably heat treated to a hardness of 60 to 80 Rockwell-C (Rc). The nickel plating of the pin threaded connection is not heat treated and has a hardness in the range of about 40 to 45 Rc. The recommended process temperature used in heat treating the nickel plating must be below the temperature at which the heat treatment of the tool joint itself would be affected. In addition to providing threaded connections of different hardness to reduce the possibility of galling, the heat treating of the nickel plating helps assure that the nickel plating will not be effected by high temperatures encountered in geo-thermal environments.

The zinc base thread compound used in the practice of the invention is commercially available from a number of sources and is well known to those skilled in the well drilling arts. Commercially available zinc base thread compounds containing finely powdered metallic zinc in the range from about 40% to 60% by weight are acceptable for the present purpose. The preferred zinc base thread compound is described in API Spec. 7, Appendix F, dated December 1981 and is about 40% to 50% finely powered metallic zinc and less than 0.3 of 1% of free sulphur.

The following examples are intended to be illustrative of the invention without limiting the scope thereof.

EXAMPLES

Pin and box threaded connections for making up a joint of drill pipe were prepared by nickel plating both the box and pin threaded connections. The nickel plating was in the range from 0.0002 to 0.0004 inches thick and was 90% to 92% nickel and 8% to 10% phosphorus. The box nickel plating was heat treated to a hardness in the range of 60 to 80 Rc. The pin nickel plating was not heat treated and has a hardness in the range of 40 to 45 Rc. The process temperature of the pin threaded connection was 200° F. and the heat treat temperature of the nickel plating of the box threaded connection was 750° F.

All tool joints were made up and broken out at least 12 times with at least 17,000 ft. lbs. torque prior to conducting any tests. The tool joints were then cleaned and visually inspected for galling. The tool joints were then doped with either a zinc base thread compound or a copper base threaded compound and made up to approximately 17,000 ft. lbs torque. A thermocouple was attached to the made up joint and the joint was placed in a horizontal draw furnace set at the desired temperature. The tool joint was kept at the desired temperature for at least two hours after the temperature indicated in Table I was reached. The tool joints were then removed from the furnace and moved to a torsion machine.

A mandrel was used to apply torque to the heated joints to prevent damage to the torsion machine and to speed the installation of the heated joints into the machine. Make up torque was applied to the heated tool joints and readings taken of the torque required for additional make up. Tool joints were made up varying amounts after heating and then broken out and the break out torque was recorded. The results are shown in Table I.

TABLE I

| Test No. | Temp (°F.) | Thread Compound | Initial Makeup Torque (ft. lbs.) | Initial Movement (ft. lbs.) | Breakout Torque (ft. lbs.) | Remarks |
|---|---|---|---|---|---|---|
| +1 | 350 | zinc base | 17,540 | 25,000 | 41,660 | |
| +2 | 356 | copper base | 17,280 | 12,000 | — | yielding began at 12,500 ft. lbs. |
| +3 | 532 | copper base | 17,500 | 9,350 | 5,870 | yielding began at 9,350 ft. lbs. |
| +4 | 534 | zinc base | 17,460 | — | 30,160 | eratic behavior up to 30,160 ft. lbs. |
| +5 | 685 | copper base | 17,410 | 11,000 | 5,280 | yielding began after initial movement |
| +6 | 312 | copper base | 17,480 | 8,800 | 7,210 | yielding began after initial movement |
| +7 | 250 | copper base | 17,500 | — | 17,230 | |
| *8 | 375 | zinc base | 17,500 | 15,500 | 25,430 | max. make up 28330 ft-lbs |
| *9 | 349 | copper base | 17,550 | 8,000 | 13,270 | |
| *10 | 491 | zinc base | 17,480 | 19,590 | 20,560 | max. make up 23899 ft-lbs |
| *11 | 491 | copper base | 17,480 | 9,770 | 14,050 | |
| *12 | 653 | copper base | 17,450 | 12,210 | 11,870 | |
| *13 | 653 | zinc base | 17,440 | 29,000 | 14,280 | |
| 0·14 | 347 | zinc base | 17,430 | 11,500 | 21,190 | make up shoulder and threads galled |
| 0·15 | 347 | copper base | 17,550 | 10,940 | 19,060 | make up shoulder galled |

*These tool joints were nickel plated.
+These tool joints were copper plated.
0These tool joints were not plated.

The test results show that on copper plated tool joints at temperatures above about 300° F., copper base thread compound has a low coefficient of friction which promotes downhole make up. On copper plated tool joints at temperatures above about 300° F., zinc base thread compound exhibits erratic frictional properties. The joints require more torque to break the connection than to make it up. Tool joints with no protective plating are likely to gall at temperatures above about 300° F. regardless of the thread compound used.

On nickel plated tool joints at temperatures above about 300° F., the frictional properties of copper base thread compound are such that the tool joint does not transmit its initial make up torque. On nickel plated tool joints at temperatures above about 300° F., zinc base thread compound exhibits much less erratic frictional properties as shown in tests 8, 10 and 13.

An invention has been provided with significant advantages. The nickel plated tool joints of the invention made up with zinc base thread compounds can be broken out at less than maximum make up torque and yet inhibit downhole make up. Copper plated tool joints used with zinc base thread compound at elevated temperatures have erratic frictional properties and are often difficult to breakout on the rig floor. Copper plated tool joints used with copper base thread compound at elevated temperatures are prone to downhole make up because the coefficient of friction is drastically reduced. The nickel plated tool joints made up with zinc base thread compound are especially well adapted for drilling in high temperature environments such as in geothermal wells.

While the invention has been shown in only one of its forms, it is not thus limited but is susceptible to various changes and modifications without departing from the spirit thereof.

I claim:

1. A method of connecting joints of drill pipe for rotary earth drilling in a geothermal well, the joint having tool joint members on each end with threaded connections for connecting the joint with other joints of drill pipe, comprising the steps of:

applying nickel plating to a portion of the threaded connection of at least one of said tool joint members;

applying a zinc base thread compound to the threaded connection; and making up a joint of drill pipe by threadedly connecting the nickel plate threaded connection of one tool joint member with the threaded connection of a mating tool joint member.

2. A method of connecting a joint of drill pipe for rotary earth drilling in a geothermal well, the joint having tool joint members on each end with threaded connections for connecting the joint with other joints of drill pipe, comprising the steps of:

applying nickel plating to the threaded connection of at least one of said tool joint members, said nickel plating being applied over the entire threaded connection to at least the last full thread of said tool joint member;

applying a zinc base thread compound to the threaded connection; and making up a joint of drill pipe by threadedly connecting the nickel plated threaded connection of one tool joint member with the threaded connection of a mating tool joint member.

3. A method of connecting a joint of drill pipe for rotary earth drilling in a geothermal well, the joint having pin and box tool joint members on the respective ends thereof with threaded connections for connecting the joint with other joints of drill pipe, comprising the steps of:

applying nickel plating to a portion of the threaded connection connection of both the pin and box tool joint members of the joint of drill pipe;

heat treating at least one of the pin and box tool joint members to produce a different hardness in the nickel plating of the member so treated;

applying a zinc base thread compound to the threaded connection; and making up a joint of drill pipe by threadedly connecting the nickel plated threaded connection of one tool joint member with the nickel plated threaded connection of a mating tool joint member.

* * * * *